US012762912B2

United States Patent
(12) United States Patent
Mutlu et al.

(10) Patent No.: US 12,762,912 B2
(45) Date of Patent: Oct. 13, 2026

(54) METHOD FOR SELECTIVELY OPENING AT LEAST ONE ENTRANCE OF A VEHICLE

(71) Applicant: MERCEDES-BENZ GROUP AG, Stuttgart (DE)

(72) Inventors: Özgür Mutlu, Stuttgart (DE); Michael Seidel, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 29 days.

(21) Appl. No.: 18/880,885

(22) PCT Filed: Jun. 7, 2023

(86) PCT No.: PCT/EP2023/065260
§ 371 (c)(1),
(2) Date: Jan. 3, 2025

(87) PCT Pub. No.: WO2024/008381
PCT Pub. Date: Jan. 11, 2024

(65) Prior Publication Data
US 2026/0170891 A1 Jun. 18, 2026

(30) Foreign Application Priority Data
Jul. 5, 2022 (DE) ..................... 10 2022 002 455.1

(51) Int. Cl.
*G07C 9/00* (2020.01)
*G07C 9/29* (2020.01)

(52) U.S. Cl.
CPC ..... *G07C 9/00309* (2013.01); *G07C 9/00896* (2013.01); *G07C 9/29* (2020.01); *G07C 2209/63* (2013.01)

(58) Field of Classification Search
None
See application file for complete search history.

(56) References Cited

U.S. PATENT DOCUMENTS 8,935,052 B2 1/2015 Hermann
11,680,437 B2 6/2023 Lammich
(Continued)

FOREIGN PATENT DOCUMENTS

CA 2925591 C * 5/2018 ........... H04L 12/282
CA 3030914 A1 * 7/2019 ............ H04W 48/20
(Continued)

OTHER PUBLICATIONS

International Search Report and Written Opinion mailed Sep. 15, 2023 in related/corresponding International Application No. PCT/EP2023/065260.
(Continued)

*Primary Examiner* — Fekadeselassie Girma
(74) *Attorney, Agent, or Firm* — PATENT PORTFOLIO BUILDERS PLLC

(57) ABSTRACT

An entrance of a vehicle is selectively opened by an ID transponder having an authorization ID for vehicle access. A simplified and more precise selective opening emerges in that an associated trigger zone on the vehicle is predetermined for at least one of the at least one entrances of the vehicle and a vector reflecting a direction of movement of the ID transponder is determined. An entrance is opened if a line extending the vector in a straight line meets the trigger zone associated with the entrance.

20 Claims, 3 Drawing Sheets

(56) References Cited

U.S. PATENT DOCUMENTS

Figure 1:
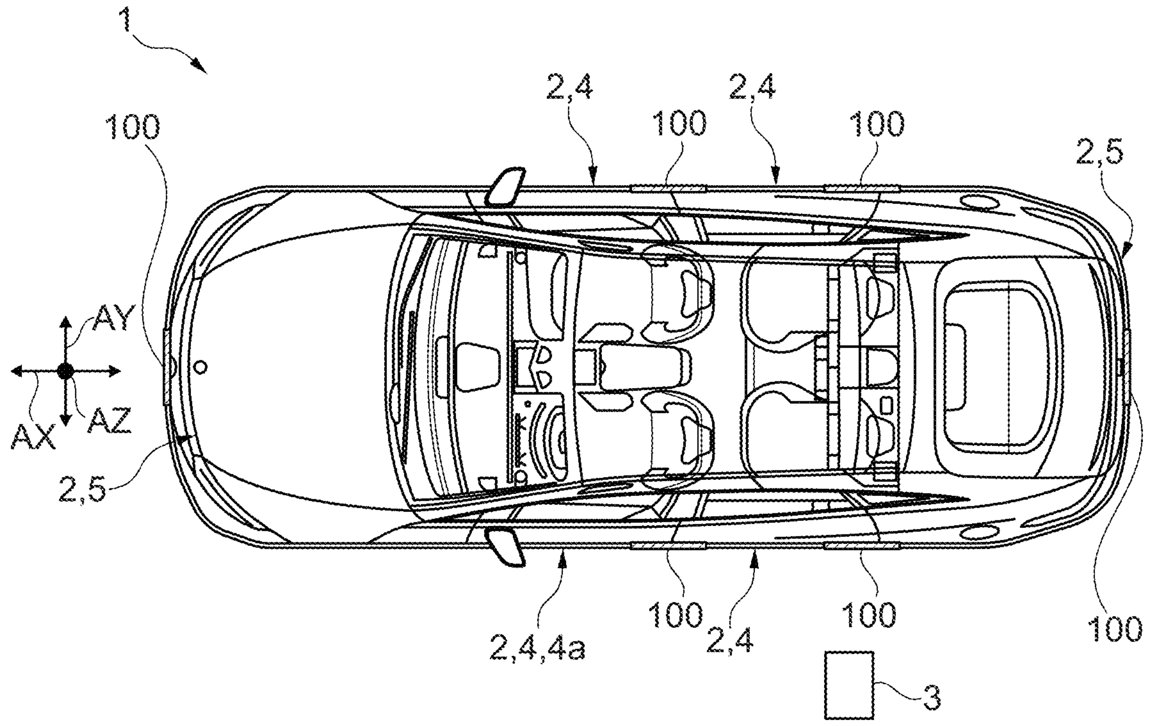

| | | | | |
|---|---|---|---|---|
| 12,337,792 | B1 * | 6/2025 | Weston | B60R 25/2045 |
| 2016/0001742 | A1 | 1/2016 | Miyazawa et al. | |
| 2016/0176382 | A1 | 6/2016 | Siswick et al. | |
| 2018/0134212 | A1 | 5/2018 | McNabb et al. | |
| 2019/0061746 | A1 | 2/2019 | Abinger et al. | |
| 2020/0124420 | A1 * | 4/2020 | Andreuzzi | A61H 3/061 |
| 2020/0314651 | A1 | 10/2020 | Pirch et al. | |
| 2021/0188059 | A1 | 6/2021 | Lammich | |
| 2023/0339431 | A1 * | 10/2023 | Kuehner | B60R 25/305 |

FOREIGN PATENT DOCUMENTS

| | | | | |
|---|---|---|---|---|
| CA | 2973006 | C * | 8/2019 | G07C 9/29 |
| DE | 10341286 | A1 | 4/2005 | |
| DE | 102010010057 | A1 | 9/2011 | |
| DE | 102013220240 | A1 | 4/2015 | |
| DE | 102016206067 | A1 | 10/2017 | |
| DE | 102019135130 | B3 | 11/2020 | |
| DE | 102019114917 | A1 | 12/2020 | |
| JP | 2018178506 | A | 11/2018 | |

OTHER PUBLICATIONS

Office Action created Feb. 17, 2023 in related/corresponding DE Application No. 10 2022 002 455.1.

* cited by examiner

METHOD FOR SELECTIVELY OPENING AT LEAST ONE ENTRANCE OF A VEHICLE

BACKGROUND AND SUMMARY OF THE INVENTION

Exemplary embodiments of the present invention relate to a method for selectively opening at least one entrance of a vehicle by means of an ID transponder, as well as to a computer program product for executing the method.

A vehicle typically has two or more entrances, for example doors, tailgates, boot lids, and similar, which allow access to the interior of the vehicle. In order to prevent unauthorized and/or unwanted access to the vehicle, such entrances are usually locked. In order to allow an authorized user access to the vehicle, it is therefore necessary to unlock and open the corresponding entrance.

In order to enable contactless unlocking of entrances for the user, it is known that the user carries an ID transponder with them. The ID transponder contains an authorization ID for vehicle access. The vehicle is unlocked when the distance between the ID transponder and the vehicle falls below a threshold value.

A corresponding method is known from DE 103 41 286 A1, which describes an access control system for a vehicle which works on a radio basis. The vehicle is unlocked when the vehicle and a transmitter operated by a user can communicate with each other via radio.

It is known from JP-2018 178 506 A to determine the direction of movement of an ID transponder relative to a vehicle and to open an entrance of the vehicle when the direction of movement with a component approaches the entrance.

Further methods with movement-dependent activations of functions are known from DE 10 2016 206 067 A1, DE 10 2013 220 240 A1, US 2016/0001742 A1, DE 10 2019 135 130 B3, DE 10 2019 114 917 A1 and DE 10 2010 010 057 A1.

US 2020/0314651 A1 describes a system for accessing various doors in a building. A user carries an ID transponder with them, wherein each door is assigned a reader unit for communicating with the ID transponder. If the user walks past a reader unit associated with a door with the ID transponder, it is detected that the user does not wish to access the associated door and it is assumed that the user wishes to open another of the doors. Preparations are then made to unlock the other door.

Exemplary embodiments of the present invention are directed to an improved or at least different embodiments for a method for selectively opening at least one entrance of a vehicle and for a computer program product for implementing the method, which in particular eliminate disadvantages from the prior art. In particular, the present invention deals with an improved or at least other embodiments for the method and for the computer program product, which are characterized by increased simplification and reliability.

Accordingly, the present invention is based on the general idea of reproducing a direction of movement of an authorized user by means of a vector and predicting, by extending the vector, whether the user is moving in the direction of an entrance of the vehicle and opening the entrance in this case. Using the vector eliminates the need for complex and time-consuming determination of the entire movement trajectory of the user, such that the method can be carried out more easily. The use of the vector also means that naturally occurring deviations in the movement of a user to a target, in this case the corresponding entrance, are automatically and intrinsically taken into account, such that the method and thus the opening of the corresponding entrance are carried out reliably. The latter also leads to increased convenience for the user.

In accordance with the idea of the invention, the method requires the user to carry an ID transponder. The ID transponder has an authorization ID for vehicle access. The vehicle has at least one entrance. An associated trigger zone on the vehicle is predetermined for at least one of the at least one entrances to the vehicle. In addition, a vector is determined for the ID transponder, which reproduces the direction of movement of the ID transponder. The vector is extended with a straight line. If the line overlaps with at least one of the trigger zones, the entrance associated with the trigger zone is selectively opened.

The vector is straight and can therefore also be described as a directional vector. The straight course of the vector improves the simplified and reliable opening of the correspondingly associated entrance as explained above.

If the vehicle has two or more entrances and an associated trigger zone is predetermined for at least two of the entrances, the trigger zones of two entrances can overlap in an overlapping region. This is regularly the case for consecutive and/or directly neighboring entrances. In such a case, both entrances belonging to the overlapping region are preferably opened if the line overlaps with the overlapping region. Thus, if the line overlaps with at least one of the at least one trigger zones, the entrance associated with the at least one trigger zone is opened. This leads to increased convenience for the user.

In the present case, "selective" opening means in particular that, depending on the overlap of the line, only the at least one associated entrance is opened, whereas other entrances, if present, remain closed.

In the present case, "opening" an entrance or "opened" is to be understood as unlocking the entrance. It is also conceivable that the opening of an entrance also includes the mechanical opening up of an entrance, for example by means of a motor or an actuator.

In the present case, "closing" an entrance or "closed" is to be understood as locking the entrance. It is conceivable that closing also includes the mechanical closing up of the entrance, for example by means of a motor or an actuator.

The respective entrance of the vehicle allows access and/or entry into the interior of the vehicle. The respective entrance can therefore be a door or a boot lid, in particular a so-called "frunk".

The ID transponder is usually an object that a user carries with them. The ID transponder can therefore be a vehicle key, a mobile phone, a card, and the like.

In preferred embodiments, the vector is used to detect whether the ID transponder is approaching the vehicle and the line is only extended if the ID transponder is approaching the vehicle. This takes into account the fact that a user only intends to access the vehicle when the user and therefore the ID transponder they are carrying approaches the vehicle. This increases the reliability of the process. At the same time, unnecessary determinations of the line are avoided, such that the method is simplified and saves resources.

The approach can, in principle, be detected using the vector in any way.

Advantageously, the vector is used to determine an angle of the vector relative to a direction transverse to the Z-axis of the vehicle in order to detect the approach, and the angle is used to detect whether the ID transponder is approaching the vehicle. In combination with the vector, this ensures simple and reliable detection of the approach. Preferably, the angle of the vector relative to the X-axis of the vehicle is determined.

It is preferable if, in addition to determining the angle, a position or location and/or orientation of the vector to the vehicle, preferably to the respective entrance, is also detected and taken into account to detect the approach. This increases the precision of the approach detection.

The detection of the approach advantageously includes a case distinction as to whether the ID transponder and thus the user is approaching the vehicle or moving away from the vehicle.

Preferably, the detection of the approach also includes the detection of a course of the vector parallel to the respective entrance, in particular to the X-axis. In the case of such a parallel course, no approach is preferably detected. The knowledge is utilized that such a parallel course is usually present if the corresponding user merely moves past the vehicle without moving towards an entrance. This therefore improves the simplicity and reliability of the method.

In the present case, the "axes" of the vehicle are understood to be the axes in the vehicle coordinate system.

Advantageously, the vector is used to detect whether the ID transponder is moving away from the vehicle, in particular from at least one entrance, and at least one of the at least one entrances is closed if the ID transponder moves away from the vehicle or entrance. Preferably, the system detects whether the ID transponder has moved away from the respective entrance and closes the corresponding entrance if such a movement away occurs. This increases the reliability and convenience of the method.

In principle, the vector can be determined in any way.

Embodiments have proven to be advantageous in which the relative position of the ID transponder to the vehicle is determined regularly to determine the vector and the vector is determined from the last relative positions. This means the chronologically last relative positions. This leads to a simplified determination of the vector and thus a simplified implementation of the method. In addition, situations in which the ID transponder initially moves in the direction of the vehicle and then moves away from or parallel to the vehicle are detected more easily and promptly in this way. As a result, the reliability of the method is increased.

The determination of the vector from the last relative positions determined can occur in any way.

It is conceivable to determine the vector by means of an interpolation of the last relative positions determined. In particular, it is conceivable to determine the vector by linear interpolation of the relative positions and/or by means of interpolation using the method of least squares. This leads to a simple, precise and reliable determination of the vector and thus to a corresponding increase in the simplification and reliability of the method.

It is conceivable to use the last determined relative position of the ID transponder as the tip of the determined vector.

The determination of the vector, preferably the determination of the relative positions of the ID transponder to the vehicle, is expediently carried out without contact.

Advantageously, the vector and the relative positions of the ID transponder to the vehicle are determined by means of electromagnetic waves, in particular by radio.

In preferred embodiments, the respective relative position of the ID transponder to the vehicle and thus the vector is determined using ultra-wideband. This leads to increased precision in determining the relative position and thus the vector. In addition, ultra-wideband modules are usually present in vehicles, such that no further signal transmissions are required to carry out the method. Consequently, the method is simplified.

For this purpose, the vehicle has at least one radio module, in particular an ultra-wideband module, which interacts with the ID transponder, in particular communicates, such that the relative position of the ID transponder to the vehicle is detected and determined.

The determination of the vector or the relative positions of the ID transponder using electromagnetic waves, in particular ultra-wideband, depends on the range of the corresponding waves. Accordingly, the vector is only determined when there is a sufficiently high interaction with the corresponding waves. It is advantageous to carry out the method only when the range and/or the signal strength of the waves exceed predetermined values. The reliability of the method is thus increased.

The determination of the relative positions and/or the determination of the overlap of the line can be carried out in any desired way.

Advantageously, the overlap is determined by means of triangulation. For this purpose, for example, triangulation can be carried out using the vector and the angle.

The relative position of the ID transponder to the vehicle is advantageously determined by means of triangulation. For this purpose, the vehicle preferably has at least two radio modules.

It is conceivable to open the respective entrance directly when the line and the associated trigger zone overlap.

In preferred embodiments, at least one of the entrances, preferably the respective entrance, is additionally only opened when a distance between the tip of the vector and the vehicle, preferably in the region of the associated trigger zone, falls below a predetermined threshold value. This means that at least one of the entrances, preferably the respective entrance, is opened when the line overlaps with the trigger zone and the distance is also below the threshold value. This particularly prevents the entrance from being opened prematurely. This also prevents the entrance from being opened in vain above the threshold value when the ID transponder moves away from the entrance. This therefore increases the precision of the method.

It is preferable if at least the associated entrance is closed when the threshold value is exceeded, i.e., when the tip of the vector or the ID transponder exceeds a distance to the vehicle in the region of the entrance.

The threshold value is advantageously defined relative to an outer shell of the vehicle. This means that the distance is also defined relative to the outer shell of the vehicle.

In preferred embodiments, the threshold value corresponds to a radius emanating from a center point arranged on the outer shell of the vehicle. The center point is conveniently arranged in the region of the associated trigger zone, in particular in the trigger zone. This leads to a simplified implementation of the method and increased precision.

In principle, it is conceivable to determine the distances and thus the threshold value, the vector and the relative positions in a three-dimensional space.

The method is simplified by the fact that the at least one trigger zone, the vector and the line are only specified and determined two-dimensionally in a plane running transversely or inclined to the Z-axis of the vehicle. In addition to simplifying the method, this also results in a resource-saving design.

Preferably, the vector, the line, and the at least one trigger zone are specified or determined in a plane extending transversely to the Z-axis of the vehicle, preferably in a plane spanned by the Y-axis and the X-axis. This means that the at least one trigger zone, the vector, and the line are only specified or determined in a plan view of the vehicle. This leads to a further simplification of the method and to increased precision.

It is understood that there can be different ID transponders for the same vehicle, wherein the respective ID transponder can have an authorization ID for predetermined entrances or only for a single entrance. In this case, opening only takes place if the corresponding authorization ID is present.

The method according to the invention is preferably carried out by means of a computer program product which is designed accordingly.

The computer program product advantageously contains instructions that can be read by a computer system, such that the computer system executes the method when the computer program product is executed.

The computer program product is advantageously stored on a memory system having at least one non-volatile memory.

It is understood that the computer program product is also within the scope of this invention.

The method, in particular the computer program product, is advantageously carried out at least partially in the vehicle. The vehicle is designed accordingly for this purpose. By way of example, the vehicle can at least partially have the computer system.

Further important features and advantages of the invention emerge from the sub-claims, from the drawings and from the associated description of the figures using the drawings.

It is understood that the features discussed here and to be mentioned below can be used not only in the combination specified in each case, but also in other combinations or on their own without leaving the scope of the present invention.

Preferred exemplary embodiments of the invention are depicted in the drawings and are explained in more detail in the following description, wherein identical reference numerals refer to identical or similar or functionally identical components.

BRIEF DESCRIPTION OF THE DRAWING FIGURES

Figure 2:
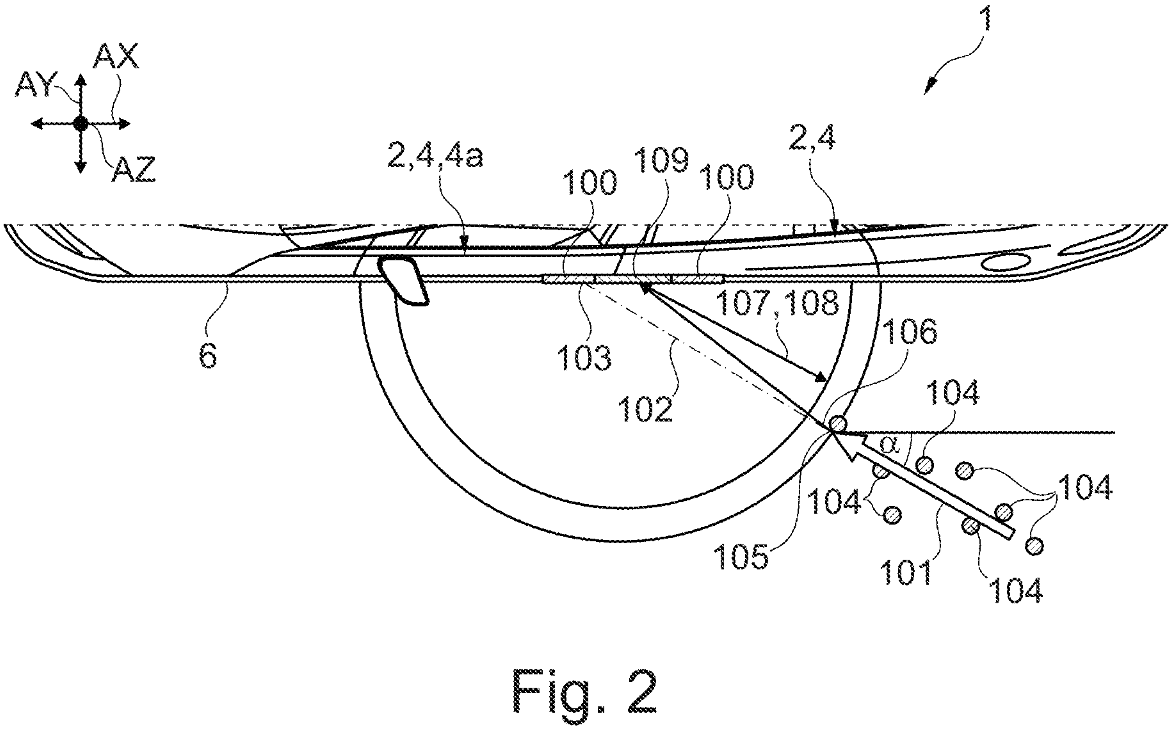
Figure 3:
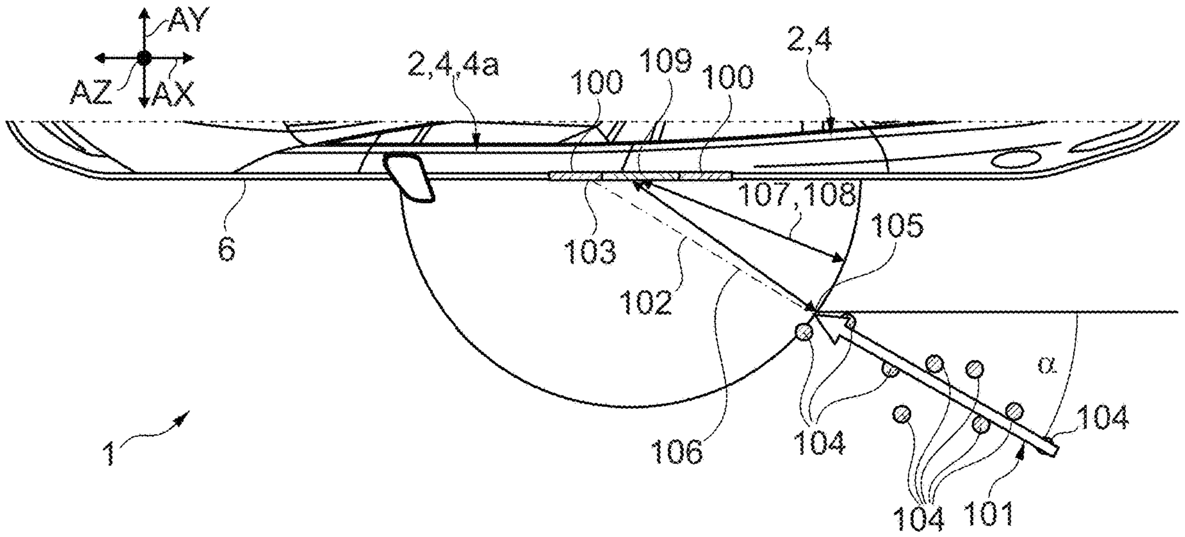
Figure 4:
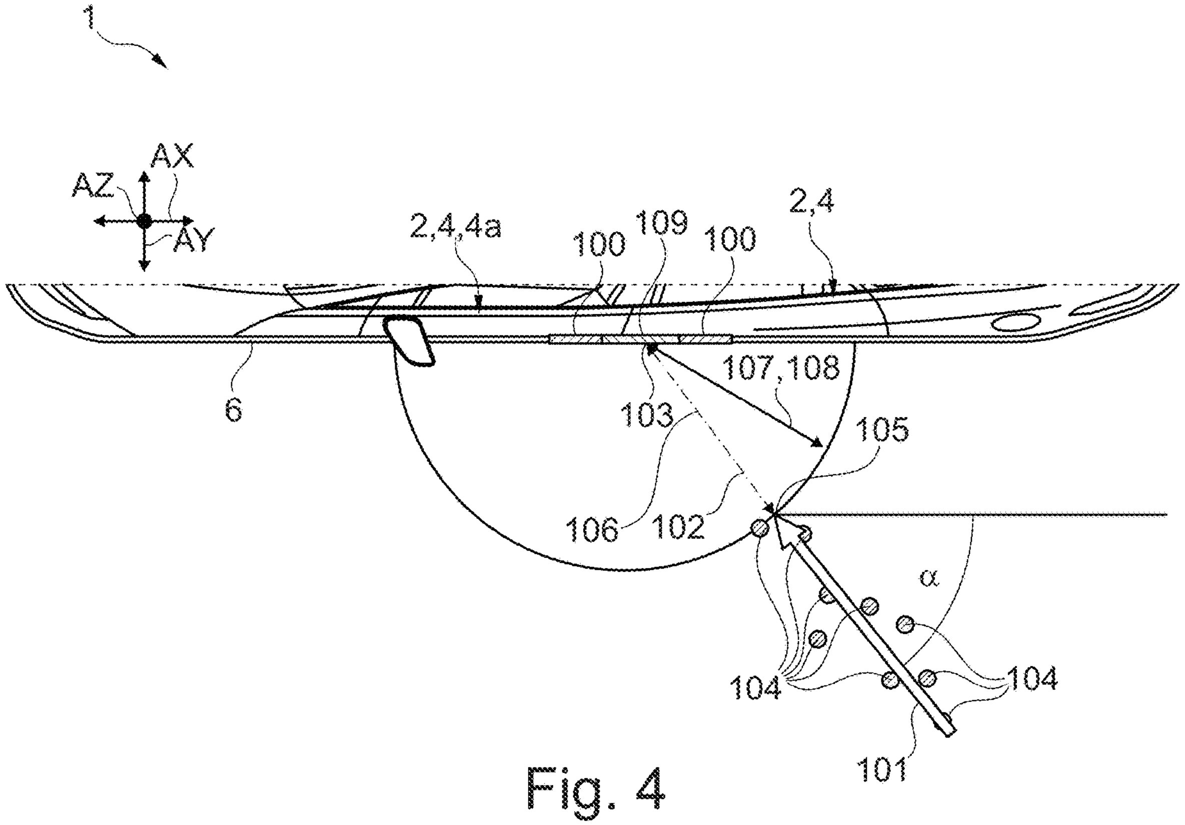
Figure 5:
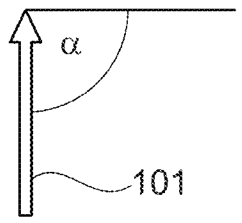
Figure 6:
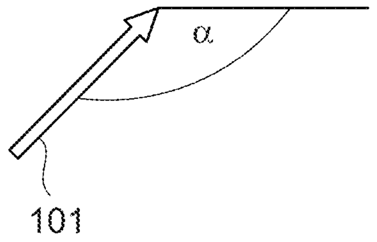
Figure 7:
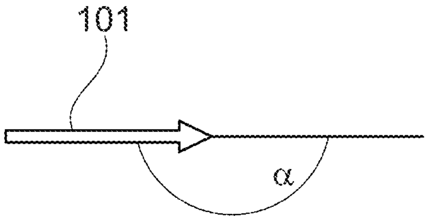
Figure 8:
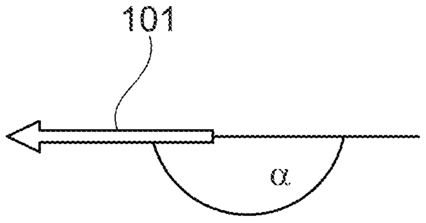
Figure 9:
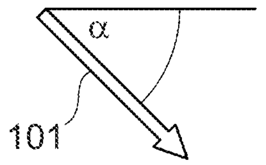
Figure 10:
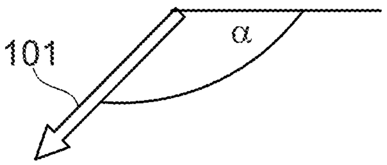

Here are shown, schematically in each case:

FIG. 1 a simplified plan view of a vehicle having trigger zones,

FIG. 2 a partial view of FIG. 1 having a vector during an approach of an ID transponder, FIG. 3 the view of FIG. 2 during a further approach of the ID transponder, FIG. 4 the view of FIG. 3 during another approach of the ID transponder, and FIG. 5 to 10 in each case, a simplified view of the vector with a different course.

DETAILED DESCRIPTION

A vehicle 1, as shown in a simplified manner in FIGS. 1 to 4, has at least one entrance 2. In the exemplary embodiments shown, the vehicle 1 has a purely exemplary total of six such entrances 2. Four of these entrances 2 are doors 4 of the vehicle 1. Two of the entrances 2 are boot doors 5 of the vehicle 1. The boot doors 5 are arranged opposite each other along an X-axis AX of the vehicle 1. In each case, two of the doors 4 are arranged opposite each other along a Y-axis AY of the vehicle 1 and adjacent to each other along the X-axis AX. FIGS. 2 to 4 each show a section of FIG. 1, in which only two of the doors 4 adjacent to each other along the X-axis AX can be seen, wherein it is assumed purely by way of example that the door 4 at the front along the X-axis is the driver's door 4, 4*a* of the vehicle 1.

Access to the interior of the vehicle 1 via the entrances 2 occurs by means of an ID transponder 2, which is only depicted in FIG. 1 in a simplified form. The ID transponder 2 has an authorization ID for vehicle access.

As can be seen from FIG. 1 in particular, an associated trigger zone 100 is predetermined on the vehicle 1 for at least one entrance 2. In the exemplary embodiments shown, an associated trigger zone 100 is predefined for the respective entrance 2 purely by way of example. In the exemplary embodiments shown, the respective trigger zone 100 is predetermined in the region of a handle, not shown further, of the associated entrance 2 and on an outer shell 6 of the vehicle 1. The trigger zones 100 are used to implement a selective opening of at least one entrance 2, in the exemplary embodiments shown of the respective entrance 2. This is explained below with reference to FIGS. 2 to 10.

As can be seen from FIGS. 2 to 4, a vector 101 representing a direction of movement of the ID transponder 3 (not shown in FIGS. 2 to 10) is determined to selectively open the entrances 2. In the exemplary embodiments shown, this is done by regularly determining the relative position 104 of the ID transponder 3 relative to the vehicle 1. The relative positions 104 are symbolized by dots in FIGS. 2 to 4. In the exemplary embodiments shown, the relative positions 104 of the ID transponder 3 relative to the vehicle 1 are determined using ultra-wideband. The vector 101 is determined from the chronologically last relative positions 104, for example by means of interpolation of the last relative position 104 determined. The vector 101 thus determined is straight and has a direction and can therefore also be referred to as a direction vector 101. The vector 101 is extended with a straight line 102 symbolized by a dashed line in FIGS. 2 to 4. If the line and one of the trigger zones 100 overlap, the entrance 2 associated with the trigger zone 100 is selectively opened. In the exemplary embodiments shown, an impact region 103 of the extended line 102 on the vehicle 1 is determined. If there is an overlap between the impact region 103 and one of the trigger zones 100, the associated entrance 2 is opened. The overlap or impact region 103 can be determined by means of triangulation.

In the exemplary embodiments of FIGS. 2 and 3, the line 102 overlaps with the trigger zone 100 associated with the driver's door 4, 4*a*. Consequently, the driver's door 4, 4*a* is opened. As a comparison of FIGS. 2 and 3 shows, in the exemplary embodiments shown, a further requirement must be met in order to open the respective entrance 2, namely falling below a predetermined distance 106 between the tip 105 of the vector 101 and the vehicle 1. This means that the respective entrance 2 is only opened when the line 102 overlaps with the associated trigger zone 100 of the entrance 2 and, in addition, the distance 106 of the tip 105 of the vector 101 to the vehicle 1 falls below a predetermined threshold value 107. In the exemplary embodiments shown, as can be seen from FIGS. 2 to 4, this threshold value 107 corresponds to a radius 108 emanating from a center point (not shown) arranged on the outer shell 6 of the vehicle 1. As can also be seen from the figures, the center point (not shown) is arranged in the region in the associated trigger zone 100. The distance 106 of the vector 101 shown in FIG. 2 is, as indicated by the semicircle, greater than the threshold value 107 or the radius 108, such that at this distance 106, the entrance 2, in this case the driver's door 4, 4*a*, is not yet opened. At the distance 106 shown in FIG. 3, the distance 106 corresponds to the threshold value 107, as can also be seen from the semicircle. Furthermore, since the line 102 in FIG. 3 overlaps with the trigger zone 100 of the driver's door 4, 4*a*, the driver's door 4, 4*a* is opened from this distance 106 and thus below the threshold value 107. The opening of the respective entrance 2 involves unlocking the entrance 2. In addition, the opening can involve mechanically opening up the entrance 2, for example with a motor not shown.

As indicated in the example in FIG. 4, the trigger zones 100 of the two entrances 2 can overlap in an overlapping region 109. If the line 102 overlaps with the overlapping region 109, both entrances 2 are opened in the exemplary embodiment shown.

In the examples shown in FIGS. 2 to 4, the ID transponder 3 and thus the user carrying the ID transponder 3, not shown, approaches the vehicle 1 such that the opening of the at least one entrance 2 described above takes place. Such an approach is detected using the vector 101. The line 102 and the determination of the overlap with the at least one trigger zone 100 is only carried out when the ID transponder 3 approaches the vehicle 1. For this purpose, in the exemplary embodiments shown, an angle a of the vector 101 relative to a direction running transverse to the Z-axis AZ of the vehicle 1, in the exemplary embodiments shown relative to the X-axis AX of the vehicle 1, is determined and the angle a is used to detect whether the ID transponder 3 is approaching the vehicle 1. FIGS. 5 to 10 show different angles a of the vector 101 relative to the X-axis AX in a clockwise direction. For the driver's door 4, 4*a*, it is therefore easy to see that the angles a depicted in FIGS. 5 and 6 signify an approach, while the angles a shown in FIGS. 7 and 8 signify a parallel movement of the ID transponder 3 to the driver's door 4, 4*a*. The angles a shown in FIGS. 9 and 10 signify a movement away from the driver's door 4, 4*a*. A position of the vector 101 or its orientation relative to the vehicle 1 must also be taken into account, particularly in FIGS. 5 and 6.

If, in the exemplary embodiments shown, the vector 101 is used to detect the ID transponder 3 moving away from the corresponding entrance 2, the entrance 2 is closed. The entrance 2 is also closed in the exemplary embodiments shown if the distance 106 exceeds the threshold value 107. The closing of the respective entrance 2 includes the locking of the entrance 2. In addition, the closing of the respective entrance 2 can also comprise a mechanical closing up, for example by means of a motor not shown.

As can be seen from FIGS. 1 to 10, in the exemplary embodiments shown, the predetermination of the at least one trigger zone 100, the determination of the vector 101 and the line 102, the determination of the overlap and the determination of the angle a are only carried out two-dimensionally in a plane with the Z-axis AZ as the normal and thus in plan view.

The method according to the invention leads to a simplified implementation of the selective opening of the entrances 2 with increased reliability.

In the exemplary embodiments shown, the method is carried out by means of a computer program product which is designed accordingly. The computer program product can be stored and/or executed at least partially in the vehicle 1.

The invention claimed is:

1. A method for selectively opening at least one entrance of a vehicle by an ID transponder having an authorization ID for access to the vehicle, the method comprising:

determining a vector representing a direction of movement of the ID transponder, wherein for at least one of the at least one entrances of the vehicle, an associated trigger zone is predetermined in a region of a handle of the entrance on an outer shell of the vehicle;

extending the vector by a straight line;

determining an impact area of the extended straight line on the vehicle; and opening the entrance associated with the trigger zone responsive to the impact area overlapping with the trigger zone, wherein the vector is used to detect whether the ID transponder is approaching the vehicle and whether the vector is parallel to an X-axis of a vehicle coordinate system of the vehicle, and wherein the extended straight line is only determined when the ID transponder is approaching the vehicle and the vector does not run parallel to the X-axis.

2. The method of claim 1, wherein an angle of the vector relative to a direction running transversely to a Z-axis of the vehicle is determined and the angle is used to detect whether the ID transponder is approaching the vehicle.

3. The method of claim 1, wherein, using the vector, it is detected whether the ID transponder is moving away from at least one entrance of the at least one entrances and at least the at least one entrance is closed when the ID transponder is moving away from the at least one entrance.

4. The method of claim 1, wherein a relative position of the ID transponder relative to the vehicle is regularly determined and the vector is determined from last relative positions of the regularly determined relative position.

5. The method of claim 4, wherein the vector is determined by an interpolation of the last relative positions.

6. The method of claim 4, wherein the relative position of the ID transponder relative to the vehicle is determined using ultra-wideband.

7. The method of claim 1, wherein the impact area overlapping with the trigger zone is determined by triangulation.

8. The method of claim 1, wherein at least one of the at least one entrances is opened when, in addition, a distance between a tip of the vector and the associated trigger zone falls below a predetermined threshold value.

9. The method of claim 8, wherein the predetermined threshold value corresponds to a radius emanating from a center point arranged on the outer shell of the vehicle.

10. The method of claim 1, wherein the trigger zones of two entrances of the at least one entrance overlap in an overlapping region, and both of the two entrances are opened when the extended straight line overlaps with the overlapping region.

11. The method of claim 1, wherein the trigger zone, the vector, and the extended straight line are specified and determined only two- dimensionally in a plane extending transversely or inclined to a Z-axis of the vehicle.

12. A non-transitory storage medium storing a computer program product for selectively opening at least one entrance of a vehicle by an ID transponder having an authorization ID for access to the vehicle, which when executed, performs:

determining a vector representing a direction of movement of the ID transponder, wherein for at least one of the at least one entrances of the vehicle, an associated trigger zone is predetermined in a region of a handle of the entrance on an outer shell of the vehicle;

extending the vector by a straight line;

determining an impact area of the extended straight line on the vehicle; and opening the entrance associated with the trigger zone responsive to the impact area overlapping with the trigger zone, wherein the vector is used to detect whether the ID transponder is approaching the vehicle and whether the vector is parallel to an X-axis of a vehicle coordinate system of the vehicle, and wherein the extended straight line is only determined when the ID transponder is approaching the vehicle and the vector does not run parallel to the X-axis.

13. The non-transitory storage medium of claim 12, wherein an angle of the vector relative to a direction running transversely to a Z-axis of the vehicle is determined and the angle is used to detect whether the ID transponder is approaching the vehicle.

14. The non-transitory storage medium of claim 12, wherein, using the vector, it is detected whether the ID transponder is moving away from at least one entrance of the at least one entrances and at least the at least one entrance is closed when the ID transponder is moving away from the at least one entrance.

15. The non-transitory storage medium of claim 12, wherein a relative position of the ID transponder relative to the vehicle is regularly determined and the vector is determined from last relative positions of the regularly determined relative position.

16. The non-transitory storage medium of claim 15, wherein the vector is determined by an interpolation of the last relative positions and the relative position of the ID transponder relative to the vehicle is determined using ultra-wideband.

17. The non-transitory storage medium of claim 12, wherein the impact area overlapping with the trigger zone is determined by triangulation.

18. The non-transitory storage medium of claim 12, wherein at least one of the at least one entrances is opened when, in addition, a distance between a tip of the vector and the associated trigger zone falls below a predetermined threshold value, and wherein the predetermined threshold value corresponds to a radius emanating from a center point arranged on the outer shell of the vehicle.

19. The non-transitory storage medium of claim 12, wherein the trigger zones of two entrances of the at least one entrance overlap in an overlapping region, and both of the two entrances are opened when the extended straight line overlaps with the overlapping region.

20. The non-transitory storage medium of claim 12, wherein the trigger zone, the vector, and the extended straight line are specified and determined only two- dimensionally in a plane extending transversely or inclined to a Z-axis of the vehicle.

* * * * *